(12) United States Patent
Karasawa et al.

(10) Patent No.: US 6,746,494 B2
(45) Date of Patent: Jun. 8, 2004

(54) BATTERY MANUFACTURING METHOD AND APPARATUS

(75) Inventors: Shoji Karasawa, Kosai (JP); Yugo Nakagawa, Toyohashi (JP); Hiromi Kajiya, Toyohashi (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 195 days.

(21) Appl. No.: 09/734,418

(22) Filed: Dec. 11, 2000

(65) Prior Publication Data

US 2001/0037558 A1 Nov. 8, 2001

(30) Foreign Application Priority Data

Dec. 14, 1999 (JP) ............................ 11-354714
Feb. 22, 2000 (JP) ........................ 2000-044102

(51) Int. Cl.⁷ ..................... H01M 2/26; H01M 10/04
(52) U.S. Cl. ..................................... 29/623.1
(58) Field of Search ............. 29/730, 731, 623.1–623.5; 219/121.12, 121.22

(56) References Cited

U.S. PATENT DOCUMENTS

| | | | |
|---|---|---|---|
| 3,440,390 A | 4/1969 | McCullough et al. | |
| 3,650,842 A | 3/1972 | Bougaran | |
| 3,732,124 A | 5/1973 | Cailley | |
| 3,756,435 A | * 9/1973 | Steigerwald | |
| 3,761,314 A | 9/1973 | Cailley | |
| 3,960,603 A | 6/1976 | Morioka et al. | |
| 4,053,687 A | 10/1977 | Coibion et al. | |
| 5,047,300 A | 9/1991 | Juergens | |
| 5,415,954 A | 5/1995 | Gauthier et al. | |
| 5,674,641 A | 10/1997 | Cheu | |
| 5,840,087 A | 11/1998 | Gozdz et al. | |
| 5,871,861 A | 2/1999 | Hirokou et al. | |
| 5,972,532 A | 10/1999 | Oweis et al. | |
| 6,120,930 A | 9/2000 | Rouillard et al. | |
| 6,304,057 B1 | 10/2001 | Hamada et al. | |
| 6,432,574 B1 | 8/2002 | Suzuki et al. | |
| 2001/0036574 A1 | 11/2001 | Fukuda et al. | |

FOREIGN PATENT DOCUMENTS

| | | | |
|---|---|---|---|
| EP | 0955682 | | 11/1999 |
| FR | 1415519 | | 7/1963 |
| JP | 53-114748 | | 10/1978 |
| JP | 60-7058 | | 1/1985 |
| JP | 60-131755 | | 7/1985 |
| JP | 4-137356 | | 5/1992 |
| JP | 7-326336 | | 12/1995 |
| JP | 8-010968 | | 1/1996 |
| JP | 2616197 | | 3/1997 |
| JP | 09-082305 A | * | 3/1997 |
| JP | 11-185724 | | 7/1999 |
| JP | 2000-58038 | | 2/2000 |
| WO | 97/18594 | | 5/1997 |

* cited by examiner

Primary Examiner—Susy Tsang-Foster
(74) Attorney, Agent, or Firm—Jordan and Hamburg, LLP

(57) ABSTRACT

Positive and negative electrode plates, after being dried, are layered alternately upon one another with intervening separators therebetween to constitute electrode plate groups. These electrode plate groups are transferred in succession from one to another of a plurality of preliminary chambers, which are respectively constructed to be able to create vacuum of various levels and arranged so that the vacuum level is gradually increased, and finally introduced into a processing chamber in which the vacuum level is highest, where the welding of collector plates to the electrode plate groups is performed with an electronic beam irradiating device. After that, the electrode plate groups are taken out through a post-processing chamber.

10 Claims, 8 Drawing Sheets

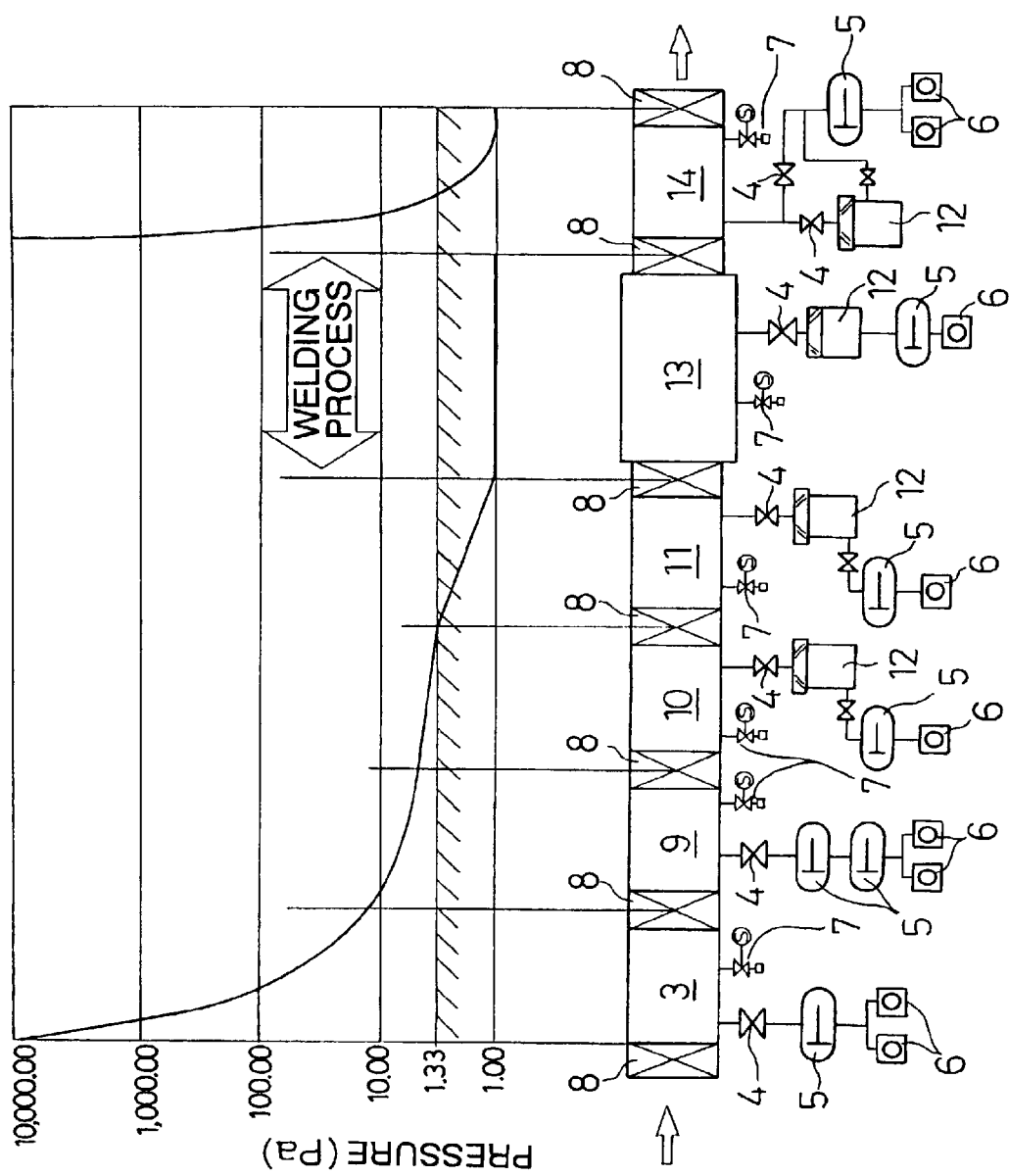

BATTERY MANUFACTURING METHOD AND APPARATUS

BACKGROUND OF THE INVENTION

The present invention relates to a method and an apparatus for manufacturing batteries, and particularly to a method and an apparatus for welding current collector plates to electrode plate groups.

For the structure of rechargeable batteries such as nickel metal hydride rechargeable batteries, a prismatic structure has been proposed, wherein an electrode plate group 21 as shown in FIG. 3A is accommodated together with a liquid electrolyte within a prismatic case (not shown) having a rectangular cross-section and an open top end which is closed with a lid member (not shown). Such structure serves to increase the electrode surface area as much as possible within a restricted space, and in addition to raising the reactive efficiency of the electrode plates, thereby enabling a large current to be taken. It therefore significantly affects battery characteristics.

More specifically, as shown in FIG. 3B in detail, the electrode plate group 21 is constituted by alternately superimposing a plurality of positive electrode plates 22 made of foamed nickel and a plurality of negative electrode plates 23 formed of punched metal with an active material of hydrogen-absorption alloy powder in paste form, each of the positive electrode plates 22 being respectively covered with bag-shaped separators 24 made of polypropylene non-woven cloth having openings on one side, so that the positive and negative electrode plates 22, 23 are layered upon one another with intervening separators 24 therebetween.

The plurality of positive electrode plates 22 and the plurality of negative electrode plates 23 respectively have their lead portions 22a, 23a on one side, that are protruded outwards on the opposite sides. The positive electrode lead portions 22a are formed by compressing the foamed nickel and seam-welding lead plates on one side thereof by ultrasonic welding, while the negative electrode lead portions 23a are constructed of part of the electrode plates which is left uncoated with the active material. A positive electrode current collector 25 and a negative electrode current collector 26, both made of either a nickel sheet or a nickel-plated steel sheet, are abutted perpendicularly to the side edges of the lead portions 22a, 23a on the opposite sides of the electrode plate group 21, and joined thereto by welding.

Welding methods using electronic beams have been proposed for the joining of the collector plates 25, 26 to the lead portions 22a, 23a. One such example is illustrated in FIG. 4 and FIGS. 5A and 5B. As shown, a plurality of corrugations 27 (seven in the illustrated example) are formed in the collector plates 25, 26 preliminarily at certain spaces in the longitudinal direction, and solder material 28 such as nickel solder is applied within the elongated indentations of the corrugations 27 on the side contacting the lead portions 22a, 23a. Under a state wherein these collector plates 25, 26 are tightly pressed against the lead portions 22a, 23a, electronic beams 30 are irradiated on the backside of the collector plates 25, 26 opposite from the side contacting the lead portions 22a, 23a in a vacuum atmosphere. The electronic beams 30 are scanned in the direction in which the electrode plates are layered as indicated by the arrow, whereupon the collector plates 25, 26 are heated and the solder material 28 melts. The collector plates 25, 26 are thus welded to the side edges of the lead portions 22a, 23a. This welding action is performed to the plurality of locations in the lengthwise direction of the collector plates simultaneously or successively. The lead portions 22a, 23a are formed with a pair of position locating holes 29a through which corresponding position locating pins 29 are passed whereby the side edges of the lead portions 22a, 23a are aligned to form flat planes, so that the welding of the collector plates 25, 26 can be favorably performed.

The production equipment for manufacturing such electrode plate groups includes a processing chamber capable of vacuum exhaustion, in which electronic beam irradiating means are arranged. Electrode plate groups 21, to which collector plates 25, 26 have been assembled, are carried into this processing chamber, and when a vacuum is drawn to a desired degree, the welding operation is performed. Thereafter, the pressure within the processing chamber is returned to an atmospheric level, whereupon the processed electrode plate group 21 is removed, and next electrode plate group is carried in.

There can also be an arrangement, wherein a preliminary chamber and a post-processing chamber are respectively arranged adjacent the processing chamber, the former being evacuated to the vacuum level of the processing chamber during the welding of the preceding electrode plate group, and the latter being arranged to return the pressure therein from the vacuum to the atmospheric level.

Japanese Laid-open Patent Application No. 53-114748 discloses an electronic beam welding apparatus applicable to mass-production of one type of works, wherein a plurality of chambers having an identical constitution are arranged in line for cyclic processes. An automatic attachment/removal mechanism is provided for successively connecting a single electronic beam irradiating means to each of the chambers corresponding to the welding process in each chamber.

The problem faced by the method wherein electrode plate groups are carried into a single processing chamber and the processing chamber is then vacuumed is that a considerably long time is required until a vacuum of desired level is drawn. Even if the vacuuming speed is increased, because of the water which is much contained within the positive electrode plates 22 and which is released gradually as time passes, the evacuation needs to be carried on for a long time until a vacuum of more than a predetermined level is created. Thus the production efficiency is extremely poor, since it took time until the welding can actually be started after the electrode plate group has been introduced into the processing chamber. Also, the cost is considerably high, and so this method was hardly applicable to mass-production.

If a multiplicity of processing chambers were provided and welding performed at the same time in these chambers, mass-production could be possible. However, such equipment with a large number of processing chambers would be horrendously expensive, hence impracticable.

In terms of time consumed for creating a high vacuum, it is also the case with a system wherein a preliminary chamber and a post-processing chamber are arranged adjacent the processing chamber, since the production tact time in such system is known to be as long as about 300 sec. In order to realize mass-production, the tact time must be reduced to about 50 sec.

The apparatus disclosed in the above-mentioned Japanese Laid-open Patent Application No. 53-114748 provides no solution to the problem that it takes time for drawing a vacuum when handling a work which contains much water such as the electrode plate group. The system requires a plurality of expensive chambers capable of drawing a high vacuum, and a complex structure for switchably connecting the electronic beam irradiating means to each of the chamber, hence the equipment cost is extremely high.

Next, another problem encountered in prior arts is described referring to FIG. 10A, which is a schematic illustration of a prior art welding method. Normally, when welding the collector plates and the electrode plate groups together by scanning an electronic beam in a direction in which the electrode plates are layered, the signal waveform for the scanning of the electronic beam is triangular, in order to make the scanning speed constant so as to apply heat uniformly along the scanning direction.

However, when applying heat to a collector plate 122 by scanning the electronic beam 123 along the widthwise direction of the collector plate, both side edges of the irradiated portion 124 receives less heat than a middle part because there is no heat applied on their outer sides and heat is more readily dissipated. As a result, there occurred a problem of incomplete welding because part of the collector plate 122 was left unmelted. If the output or time for irradiation of electronic beam was increased to augment the entire amount of heat, the heat applied to the middle part of the collector plate 122 would become excessive and it would only lead to another problem that separators interposed between electrode plates are damaged, which causes short-circuiting between the electrode plates.

In view of these problems, additional scannings 126, 127 are usually performed once or a plurality of times in spots or over a very short distance at both side edges of the collector plate 122 in addition to the overall scanning 125 over the entire width of the collector plate 122, as shown in FIGS. 10A and 10B. According to such method, however, since the additional scannings 126, 127 are required at both side edges, which take 35 ms and 25 ms respectively, in addition to the scanning 125 of the entire width of the collector plate 122 which takes 90 ms, as illustrated in FIG. 10B, the scanning time necessary for welding one line sums up to 210 ms. If a collector plate 122 is to be joined to an electrode plate group 121 at 5 locations, it takes 1050 ms. Thus the conventional welding process is very time-consuming, which is partly the cause of low productivity in the manufacture of electrode plate groups for batteries.

SUMMARY OF THE INVENTION

In view of the problems encountered in the prior arts, it is an object of the present invention to enhance the efficiency in the process steps for welding current collector plates to electrode plate groups and to reduce the production tact time without increasing cost for the equipment, so as to realize mass-production of electrode plate groups for batteries.

To accomplish the above object, the present invention provides a battery manufacturing method comprising the steps of:

drying a plurality of positive electrode plates and a plurality of negative electrode plates;

layering the positive electrode plates and negative electrode plates alternately upon one another with intervening separators therebetween, thereby constituting electrode plate groups;

assembling collector plates to the electrode plate groups;

transferring the electrode plate groups with the collector plates from one to another of a plurality of vacuum chambers having different vacuum levels; and performing a welding operation using electronic beams in one of the plurality of vacuum chambers in which a vacuum of sufficient level to effect irradiation of electronic beams is created. Since the electrode plates are first dried in the drying step, when the electrode plate groups are introduced into the vacuum chambers, the level of vacuum within these chambers can be increased in a very short period of time. Therefore, the overall production tact time can be reduced in proportion to the number of vacuum chambers. The method of the present invention is thus applicable to mass-production of batteries at low cost.

More specifically, the plurality of vacuum chambers are arranged adjacent each other such that the vacuum level is gradually increased from an upstream side to a downstream side as the electrode plate groups with the collector plates are transferred from one to another of the vacuum chambers, and the welding operation is performed in one vacuum chamber in which the vacuum level is highest. Thereby, there is very little variance in the vacuum levels between adjacent vacuum chambers, and each chamber is capable of creating a predetermined vacuum therein in a short tact time, respectively. Therefore, the vacuum of a level necessary for performing welding operation can be created during the time in which the electrode plate groups are transferred from one to another of the plurality of vacuum chambers. Moreover, the expensive electronic beam irradiating device is provided only in one vacuum chamber, and so the production equipment can be constructed at low cost.

The transferring of the electrode plate groups with the collector plates from one vacuum chamber to an adjacent vacuum chamber can be accomplished in an efficient manner by performing a series of operations wherein: a first gate provided on the upstream side of a first vacuum chamber is opened; the electrode plate groups with the collector plates are introduced into the first vacuum chamber; the first gate is closed; the first vacuum chamber is vacuumed to a predetermined level; a second gate provided on the downstream side of the first vacuum chamber is opened; and the electrode plate groups with the collector plates are moved into an adjacent second vacuum chamber.

After the welding operation has been performed, the electrode plate groups with the collector plates are introduced into a post-processing vacuum chamber before being moved to the outside. Therefore, the processed electrode plate groups can be moved to the outside without reducing the vacuum level in the vacuum chamber in which the welding operation has been performed. Since this post-processing vacuum chamber receives only the processed electrode plate groups, and since the chamber is vacuumed before the electrode plate groups are transferred thereinto, a desired level of vacuum can be obtained in a very short period of time. Therefore, it is only necessary to provide one such post-processing chamber, and so it gives practically no effects on the production tact time.

When opening a gate of a vacuum chamber on the most upstream side and when opening a gate of the post-processing vacuum chamber, a dry gas is introduced into these chambers. Thereby, outer air containing water therein can hardly enter into the vacuum chambers, and the time until a desired level of vacuum is reached can accordingly be reduced.

In the step of performing a welding operation using electronic beams, an electronic beam is irradiated on the collector plate and scanned along a direction in which the electrode plates are layered, using a signal waveform which causes the scanning speed at either end of the collector plate to become slower than the scanning speed in a middle portion of the collector plate. Since the irradiation time of electronic beam is prolonged at either end of the collector plate, the amount of heat applied to the collector plate at opposite ends is increased, whereby the entire width of the collector plate can be welded to the electrode plate group uniformly. Also, because no additional scanning is necessary at either end of the collector plate, the welding can be performed in a very short period of time, and the productivity is accordingly enhanced.

The signal waveform is obtained by combining a triangular wave and a sine wave at predetermined ratios, and specifically, the heat balance between the middle part and either end of the collector plate can be optimized if the signal waveform has triangular wave to sine wave ratios in the range of 1 to 4:1.

In order to implement the above battery manufacturing method, the present invention provides a welding apparatus for joining the current collector plates to electrode plate groups comprising:

a plurality of preliminary vacuum chambers having different vacuum levels therein arranged adjacent each other such that the vacuum level is gradually increased from an upstream side to a downstream side;

a processing chamber having a highest level of vacuum therein arranged adjacent one of said plurality of preliminary vacuum chambers, in which an electronic beam irradiating device is arranged so that a welding operation is performed therein;

a post-processing chamber connected to the processing chamber, in which the electrode plate group, to which the current collector plates have been joined, is introduced before being taken out to the outside; and means for transferring in succession the electrode plate group with the collector plates from a preliminary vacuum chamber having a lowest vacuum level to the post-processing chamber, through the plurality of another preliminary vacuum chambers having higher vacuum levels and the processing chamber. Thereby, the production tact time is reduced while maintaining the equipment cost low, and mass-production of batteries at low cost can be realized as described in the foregoing.

More specifically, preliminary vacuum chambers located on the upstream side and having lower vacuum levels are provided with vacuum means including a mechanical booster pump, whereas preliminary vacuum chambers located on the downstream side and having higher vacuum levels are provided with a vacuum means including a composite turbo molecular pump, and the post-processing chamber is provided with a vacuum means including both of the mechanical booster pump and the composite turbo molecular pump. The mechanical booster pump which exhibits high performances for creating a low degree of vacuum of about 10 Pa and a composite turbo molecular pump which exhibits high performances for creating a higher level of vacuum are combined suitably to constitute respective vacuum means taking advantage of their respective characteristics, so that expensive composite turbo molecular pumps are used in a fewer number, thereby cutting equipment cost, while ensuring that a desired level of vacuum is efficiently created.

As mentioned above, the preliminary vacuum chamber located on the most upstream side and the post-processing chamber are provided with means for introducing therein one of dry air and an inactive gas, so that outer air containing water can hardly enter into these chambers, and the time until a desired level of vacuum is reached is accordingly reduced.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 2 is a diagram given in explanation of the construction of vacuum evacuation system for preliminary chambers, a processing chamber, and a post-processing chamber, with a chart showing vacuum in each chamber;

DESCRIPTION OF PREFERRED EMBODIMENTS

A preferred embodiment for the battery manufacturing method of the present invention will be hereinafter described with reference to FIGS. 1 and 2. The construction of electrode plate groups to be produced and the welding method for joining collector plates to the electrode plate groups are substantially the same as those that have already been described in relation to the explanation of prior arts. Therefore a repetitive description thereof will not be given below, and an explanation will be given only with respect to the specific process steps in the manufacture of batteries, which are characteristic features of the present invention.

Figure 1:
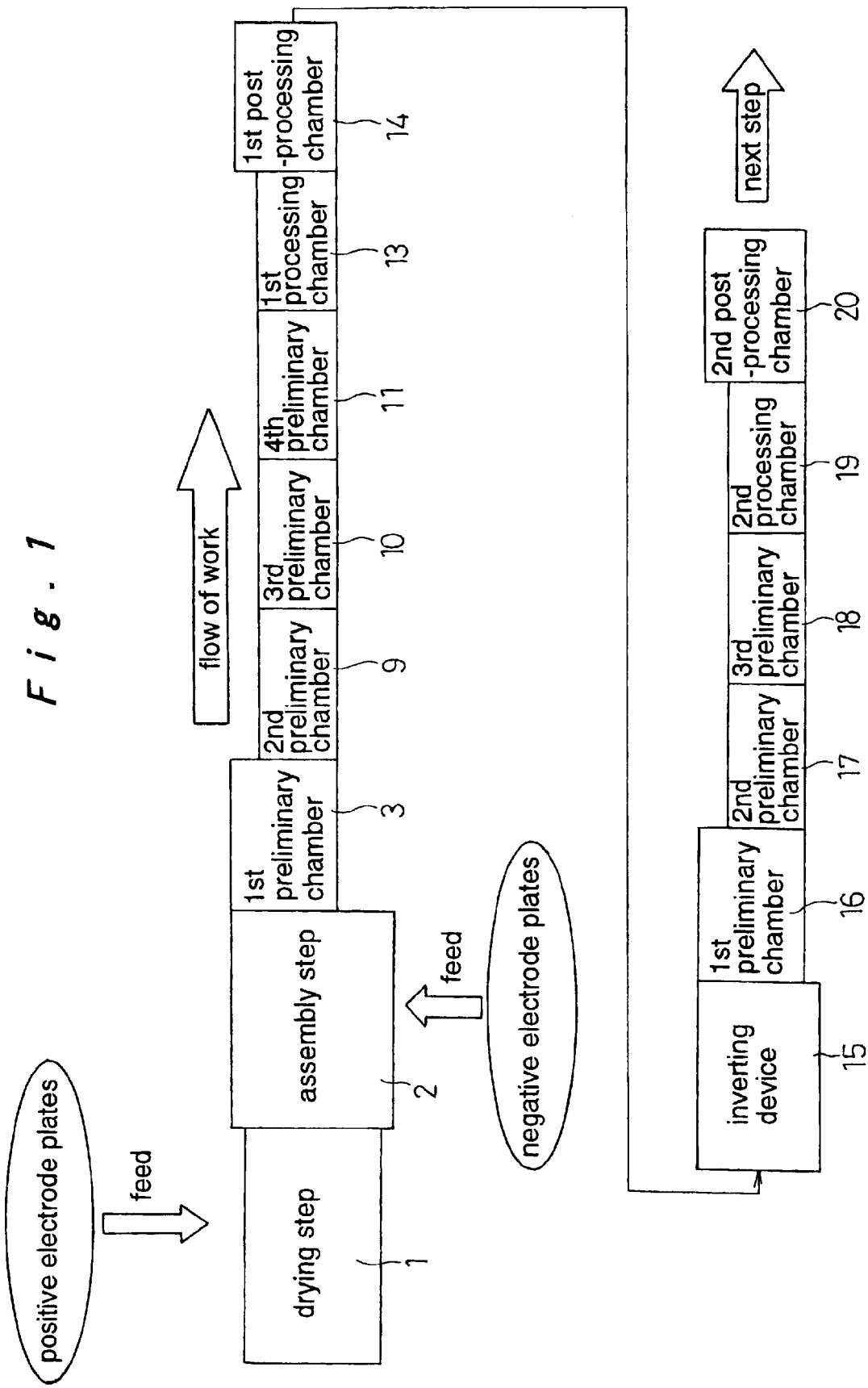
FIG. 1 is a flow diagram illustrating the production method of batteries in accordance with the present invention.
Figure 3A:
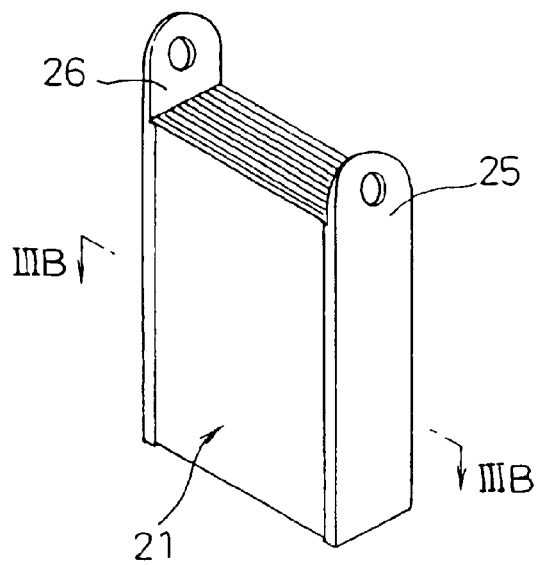
FIG. 3A is a perspective view of an electrode plate group.
Figure 3B:
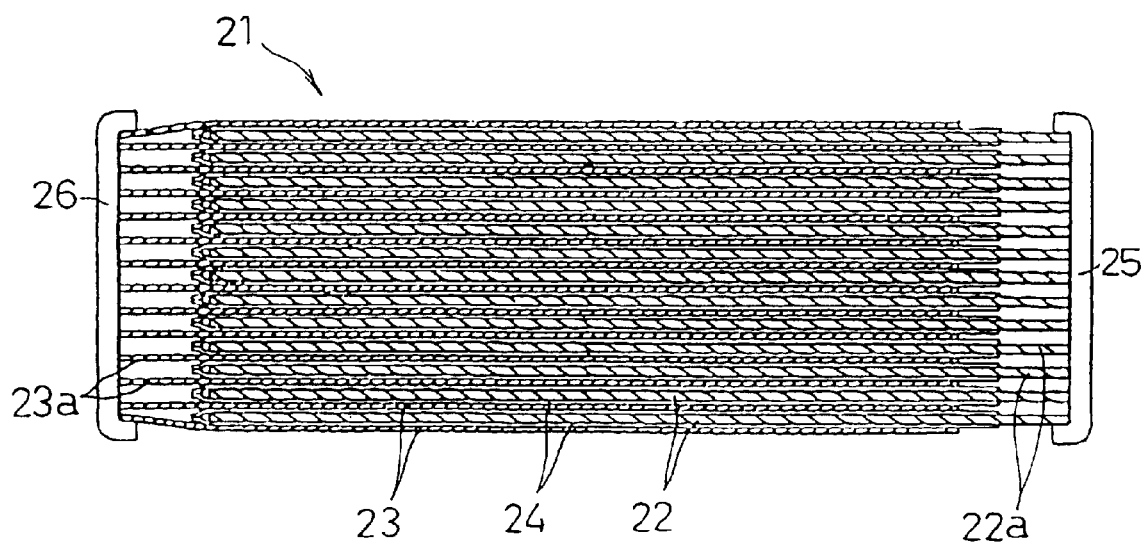
FIG. 3B is a cross sectional view taken along the line IIIB—IIIB in FIG. 3A.
Figure 4:
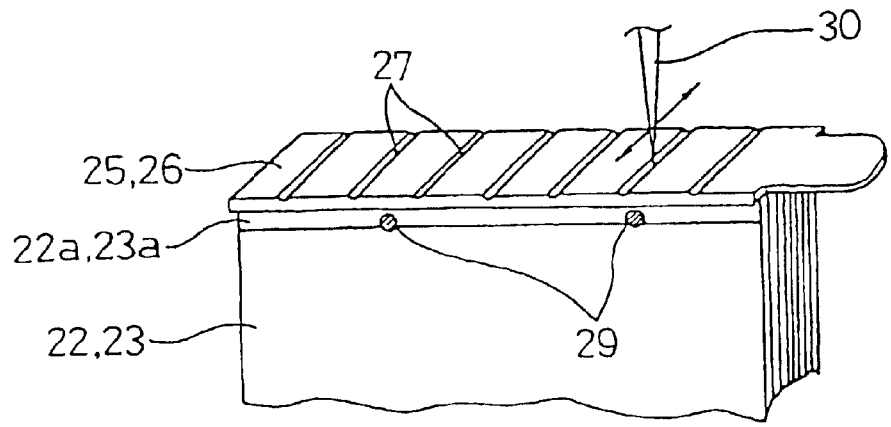
FIG. 4 is a perspective view illustrating a welding process in which a collector plate is welded to an electrode plate group.
Figure 5A:
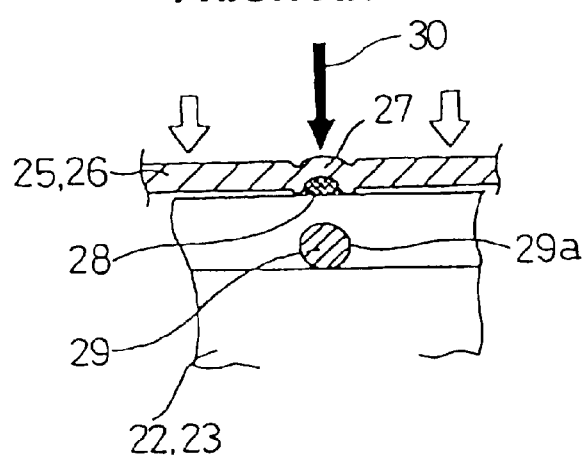
FIG. 5A is a front view and FIG. 5B is a side view, illustrating the same welding process.
Figure 5B:
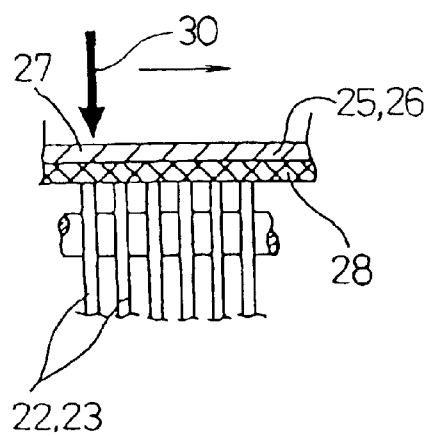

FIG. 1 illustrates a process step of a battery manufacturing process, in which electrode plate groups are assembled, and positive and negative electrode current collector plates are welded to opposite side edges of the electrode plate groups. First, positive electrode plates fabricated in separate process steps are introduced into a process step 1 for drying the electrode plates in order to remove water contained therein as much as possible. Here, the electrode plates are dried at 45° C. for more than 12 hours, whereby most of water contained therein is removed. Next, negative electrode plates fabricated in separate process steps and the positive electrode plates that have been dried in the preceding step are introduced into an assembly process step 2, wherein the positive electrode plates and the negative electrode plates are layered on a jig alternately upon one another with intervening separators therebetween so as to form an electrode plate group. Side edges on one side of the positive electrode plates and side edges on one side of the negative electrode plates are protruded respectively on opposite sides, and these side edges are aligned to form flat planes using jigs, and a positive electrode current collector and a negative electrode current collector are assembled onto these flat planes formed by the side edges of the positive and negative electrode plates, respectively. In the assembly step, control is effected so that the ambient temperature is maintained constant at 25° C. and the humidity 30%.

Next, the jigs are oriented so that a current collector is first welded to the side edges of the negative electrode plates, and transferred into a first preliminary chamber 3. To the first preliminary chamber 3 is connected a mechanical booster pump 5 through a valve 4, as shown in FIG. 2, so that it can be vacuumed from atmospheric level to a pressure level of about 10 Pa. A pair of rotary pumps 6 is connected to the evacuation side of the mechanical booster pump 5 so that large amount of air can be evacuated. Also, a dry air feeding means 7 is connected to the first preliminary chamber 3 for feeding dry air with the dew point of less than −50° C. in order to maintain the dry atmosphere within the chamber during the pressure therein is returned to the atmospheric level. The dry air feeding means 7 could also feed a dry, inactive gas such as N or He instead of dry air. The entrance of the first preliminary chamber 3 on the side of the assembly process step 2 and the exit leading to the next chamber are both provided with gates 8 that are capable of hermetically closing the chamber. All of the other chambers that will be described later are constructed with such gates 8 at their entrances and exits so that they can be hermetically closed after being opened.

After dry air has been injected into the first preliminary chamber 3 to return the pressure therein to an atmospheric level, the gate 8 on the entrance side is opened and the jigs holding the electrode plate group and collector plates are carried into the chamber. The gate 8 is then closed, the pumps 5, 6 are operated, and the valve 4 opened, for vacuuming the interior of the first preliminary chamber 3 to a predetermined vacuum level of about 10 Pa.

Next, the jigs are moved into a second preliminary chamber 9 in which a higher degree of vacuum is created. A double mechanical booster pump 5 is connected to the second preliminary chamber 9 through a valve 4, so that a vacuum of about 10 Pa to 4 Pa can be created within the chamber. A pair of rotary pumps 6 is connected to the exhaustion side of the mechanical booster pump 5, and a dry air feeding means 7 is also connected to the chamber 9.

After dry air has been injected into the second preliminary chamber 9 to make the pressure therein about 10 Pa, the gate 8 on the entrance side is opened and the jigs holding the electrode plate group and collector plates are transferred from the first preliminary chamber 3 into the second preliminary chamber 9. The gate 8 is then closed, the pumps 5, 6 are operated, and the valve 4 opened, for vacuuming the interior of the second preliminary chamber 9 to a predetermined vacuum level of about 4 Pa.

Thereafter, the jigs holding the electrode plate group and collector plates are transferred successively into a third preliminary chamber 10 and into a fourth preliminary chamber 11, in each of which a higher degree of vacuum than the previous chamber is created, in a similar manner as described above. Composite turbo molecular pumps 12 are connected to both of the third and fourth preliminary chambers 10, 11 via respective valves 4, and a mechanical booster pump 5 and a rotary pump are connected in series to the exhaustion side of each of the composite turbo molecular pumps 12. Also, dry air feeding means 7 are connected to each of the third and fourth preliminary chambers 10, 11.

After the pressure within the third preliminary chamber 10 has been returned to the same level of pressure 4 Pa of the second preliminary chamber 9, the gate 8 on the entrance side is opened and the jigs holding the electrode plate group and collector plates are transferred from the second preliminary chamber 9 into the third preliminary chamber 10. The gate 8 is then closed, the pumps 12, 5, 6 are operated, and the valve 4 opened, for vacuuming the interior of the third preliminary chamber 10 to a predetermined vacuum level of about 1.4 Pa. Successively, the pressure within the fourth preliminary chamber 11 is returned to the same level of pressure 1.4 Pa of the third preliminary chamber 10, the gate 8 on the entrance side is opened, and the jigs holding the electrode plate group and collector plates are transferred from the third preliminary chamber 10 into the fourth preliminary chamber 11. The gate 8 is then closed, the pumps 12, 5, 6 are operated, and the valve 4 opened, for vacuuming the interior of the fourth preliminary chamber 11 to a predetermined vacuum level of about 1.0 Pa.

Next, the jigs holding the electrode plate group and collector plates are transferred from the fourth preliminary chamber 11 into a first processing chamber 13. Within the first processing chamber 13, an electronic beam irradiating device is arranged for welding collector plates to both sides of electrode plate groups. The processing chamber is also provided with a composite turbo molecular pump 12 connected thereto, a mechanical booster pump 5 and a rotary pump 6 being connected in series to the evacuation side of the composite turbo molecular pump 12. Also, a dry air feeding means 7 is connected to the first processing chamber 13.

When a vacuum of about 1.0 Pa is created within the fourth preliminary chamber 11, the gate 8 on the entrance side of the processing chamber is opened and the jigs are introduced into the first processing chamber 13. The gate 8 is then closed, and the welding operation is performed wherein electronic beams are irradiated with the electronic beam irradiating device onto predetermined welding locations of the collector plate. It is well known that the welding operation using electronic beams should be performed within a vacuum of about 1.33 Pa. According to the method of the present invention, it is ensured that the processing chamber has been vacuumed to a sufficient level by the time the welding operation is performed. It should be noted that the dry air feeding means 7 is used for maintaining the dry atmosphere within the first processing chamber 13, and therefore, while dry air or gas is being introduced into the chamber, evacuation of the chamber is also being performed, so, as to maintain the predetermined vacuum level within the chamber.

When the welding of the collector plate to the electrode plate group is completed, the jigs are moved into a first post-processing chamber 14. To the first post-processing chamber 14 is connected a mechanical booster pump 5 and a composite turbo molecular pump 12 in parallel via a pair of valves 4, that are switchably operated. A pair of rotary pumps 6 is connected on the evacuation side, of the mechanical booster pump 5. The composite turbo molecular pump 12 is connected to the mechanical booster pump 5 on its evacuation side. Also, a dry air feeding means 7 is connected to the first post-processing chamber 14 for feeding dry air with the dew point of less than −50° C.

After the first post-processing chamber 14 has been vacuumed to a level of about 4 Pa by means of the mechanical booster pump 5 and the pair of rotary pumps 6, the chamber is further vacuumed to a level of about 1.0 Pa by means of the composite turbo molecular pump 12. At this time, because the jigs holding the electrode plate group and the collector plates are not present within the first post-processing chamber 14, the chamber can be vacuumed to a desired level in a short period of time. The gate 8 of the first post-processing chamber 14 is then opened, the jigs moved thereinto, and the gate 8 closed. Thereafter, dry air is injected into the chamber by the dry air feeding means 7 to return the pressure within the chamber to an atmospheric level under the dry air atmosphere. The gate 8 is then opened to remove the jigs, after which the gate 8 is closed.

The process steps described above are repeated, whereby collector plates are welded in succession to the side edges of the negative electrode plates of the electrode plate groups, and removed from the first post-processing chamber 14. The jigs are then fed to an inverting device 15, where they are inverted so that collector plates can be welded to the side edges of the positive electrode plates of the electrode plate groups in the succeeding process steps. After that, the inverted jigs holding the electrode plate groups with collector plates are introduced into a first preliminary chamber 16, and then into a second preliminary chamber 17 and a third preliminary chamber 18 successively, in which a vacuum of gradually increasing level is created, in a similar manner as in the case when the collector plates are welded to the negative electrode plate side edges as described above. When the jigs are introduced into a second processing chamber 19 in which a sufficient level of vacuum has been drawn, the welding operation is performed, and they are finally discharged to a next process step through a second post-processing chamber 20.

While the dry air feeding means 7 are provided to all of the chambers, respectively, in the embodiment described above, it will suffice to provide such dry air feeding means 7 only to the first preliminary chamber 3 and the first post-processing chamber 14, which are opened to the outside in order to introduce jigs therein or discharging jigs to the outside. It is preferable, however, that all of the chambers be provided with the dry air feeding means 7, because it is thereby easier to maintain the dry condition in each chamber, since the water component that may be released in each of the chambers can be converted into dry air immediately, and therefore it is possible to reduce the time until a desired level of vacuum is created. Also, with the dry air feeding means 7, variations in the pressure within the chambers when the gate 8 is opened can be eliminated.

According to the embodiment described above, because the electrode plates are first dried in the drying step, when the electrode plate groups are introduced into the following first to fourth preliminary chambers, the level of vacuum within these chambers can be increased in a very short period of time. The electrode plate groups to be processed are transferred from one into another of a plurality of preliminary chambers arranged adjacent each other such that the level of vacuum within these chambers is gradually increased, and the welding is performed in a processing chamber in which the level of vacuum is highest. There is very little variance in low pressure between adjacent preliminary chambers, and each chamber is capable of creating a predetermined vacuum therein in a short pitch time, respectively. Therefore, the overall production time for this tact system wherein works are successively transferred from one process step to another in a short pitch time can be remarkably reduced. The vacuum of a level necessary for performing welding operation can be created during the time in which the electrode plate groups are transferred from one to another of the plurality of preliminary chambers. The expensive electronic beam irradiating device is provided only in the processing chamber, and so the production equipment can be constructed at low cost.

Since the electrode plate groups that have been processed are removed from the processing chamber through a post-processing chamber, it is not necessary to increase the pressure level within the processing chamber when taking out the works therefrom. Also, since the post-processing chamber is constructed to be able to increase the vacuum level in a very short period of time, it is only necessary to provide one such post-processing chamber to each processing chamber, so it gives no significant effects on the production time of the entire tact system.

Also, since the dry air feeding means 7 are provided at least to the first preliminary chamber 3 and the first post-processing chamber 14 so that dry air is introduced into these chambers when their gate 8 is opened, outside air containing water can hardly enter into the chambers. Thereby, the time until a desired vacuum is reached can be shortened.

While the first and second preliminary chambers 3, 9 are provided with mechanical booster pumps 5 which exhibit excellent performances-with respect to flowing air, the third and fourth preliminary chambers 10, 11 are provided with composite turbo molecular pumps 12 which exhibit excellent performances with respect to air at molecular level. The post-processing chamber 14 is provided with both of the mechanical booster pump 5 and the composite turbo molecular pump 12. Thus the expensive composite turbo molecular pumps are provided in reduced number according to the method of the present invention, thereby reducing the equipment cost while ensuring that a predetermined vacuum is created in an efficient manner.

Figure 6:
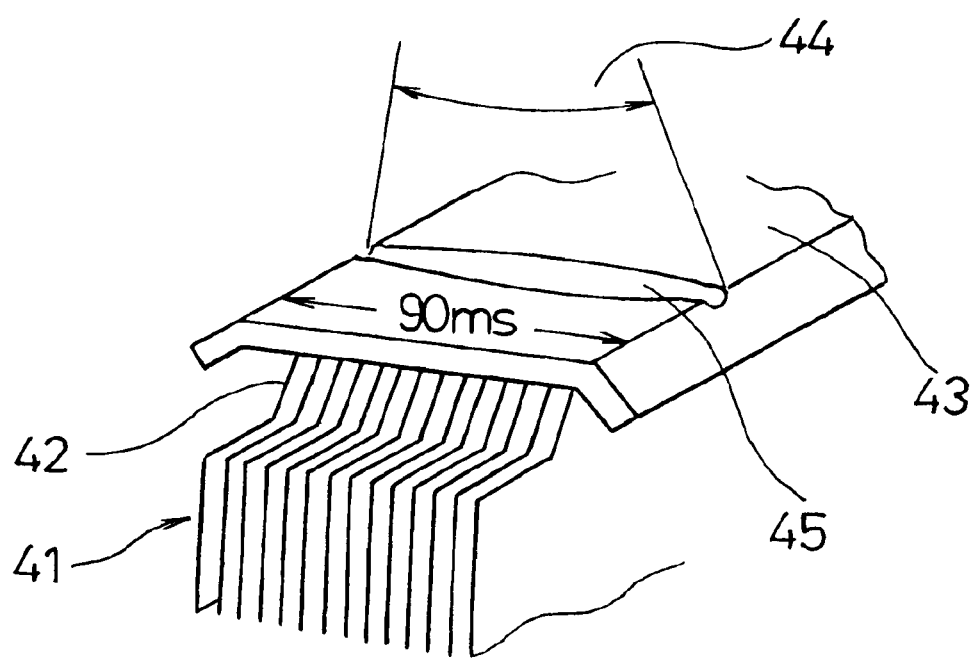
FIG. 6 is a perspective view illustrating a method for welding a collector plate to an electrode plate group in accordance with the present invention.
Figure 7:
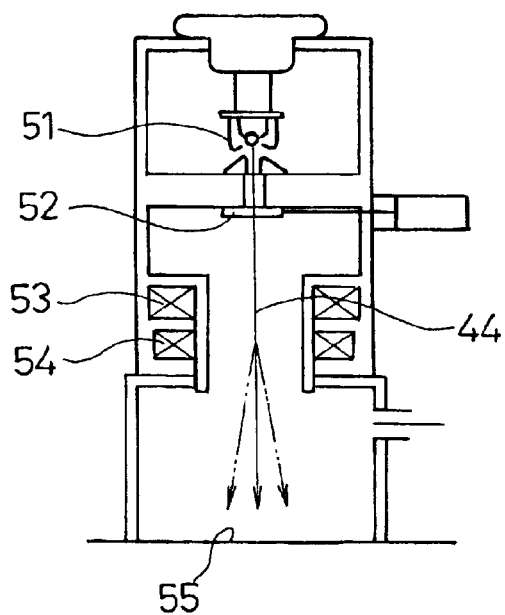
FIG. 7 is a schematic diagram illustrating the construction of the electronic beam irradiating device.
Figure 8:
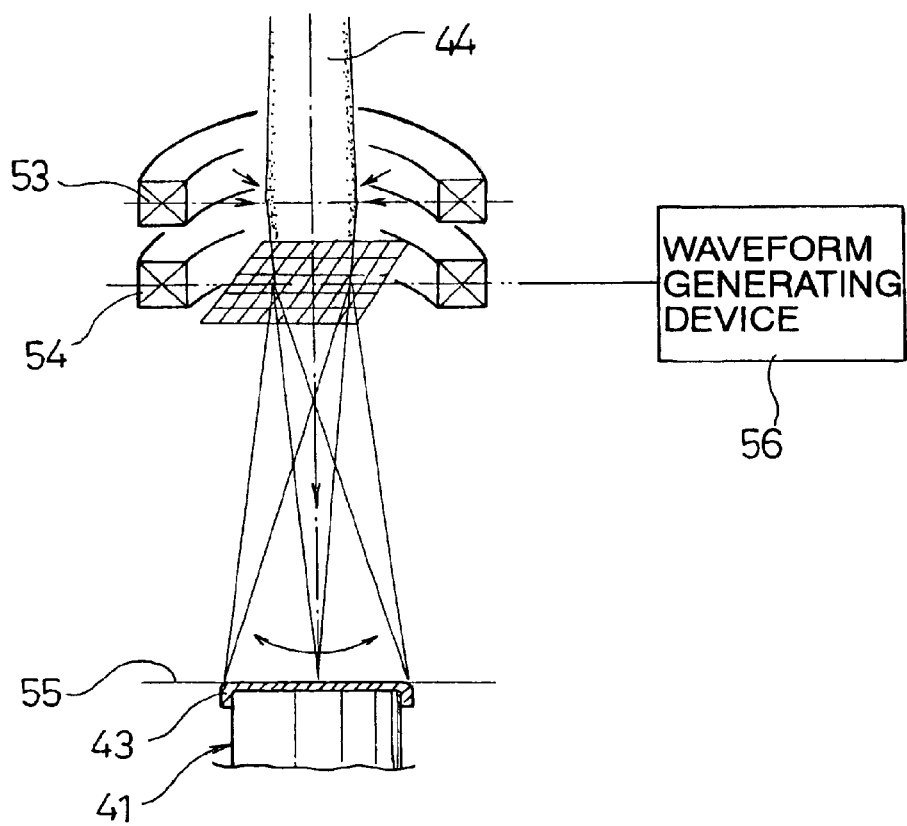
FIG. 8 is a schematic diagram illustrating major parts of the same electronic beam irradiating device.

Next, the welding process step in the battery manufacture method according to the present invention will be described in more detail. FIG. 6 illustrates the method of welding collector plates to electrode plate groups in accordance with the present invention welding method. FIG. 7 schematically shows the construction of the electronic beam irradiating device. Reference numerals 51, 52, 53, 54 respectively represent an electronic gun, a shutter, a focusing coil, and a biasing coil. An electronic beam 44 emitted from the electronic gun 51 is passed through the shutter 52, focused by means of the focusing coil 53, and biased by the biasing coil 54, so as to be irradiated onto a given location on a surface 55.

In the welding process, the outer surface of the collector plate 43, to the inner surface of which the end face of the electrode plate group 41, having electrode plates 42, is tightly pressed, is arranged on the irradiated surface 55, with the center position in the widthwise direction thereof being in alignment with the axial core of the biasing coil 54. A signal waveform generating device 56 is connected to the biasing coil 54, whereby voltage signals of any desired waveform can be applied to the biasing coil 54. Thus the electronic beam 44 is scanned repeatedly along lines in the widthwise direction of the collector plate 43. The signal waveform generating device 56 is constructed so as to be capable of generating complex waveforms that are obtained by combining, at predetermined ratio, a triangular signal waveform which causes the scanning speed to be constant, and a sinusoidal signal waveform which causes the scanning to become slow at opposite ends of the object being scanned. The triangular waves and sine waves are combined such that these waves are switched over as time passes.

Thus the electronic beam 44 is irradiated along the line 45 on the outer side of the collector plate 43 and scanned repeatedly in the widthwise direction in which the electrode plates are stacked, whereby part of the collector plate on its inner side and the solder material applied to the joints are melted, and the collector plate 43 is joined to the end edges of the electrode plates.

The scanning of electronic beam 44 is controlled by complex signal waveforms in which triangular waves and sine waves are combined at suitable rates. Therefore, the irradiation time of the electronic beam is prolonged at opposite ends of the scanned portion as compared to the middle part. The amount of heat is thus increased properly at opposite ends of the scanning object.

Figure 9:
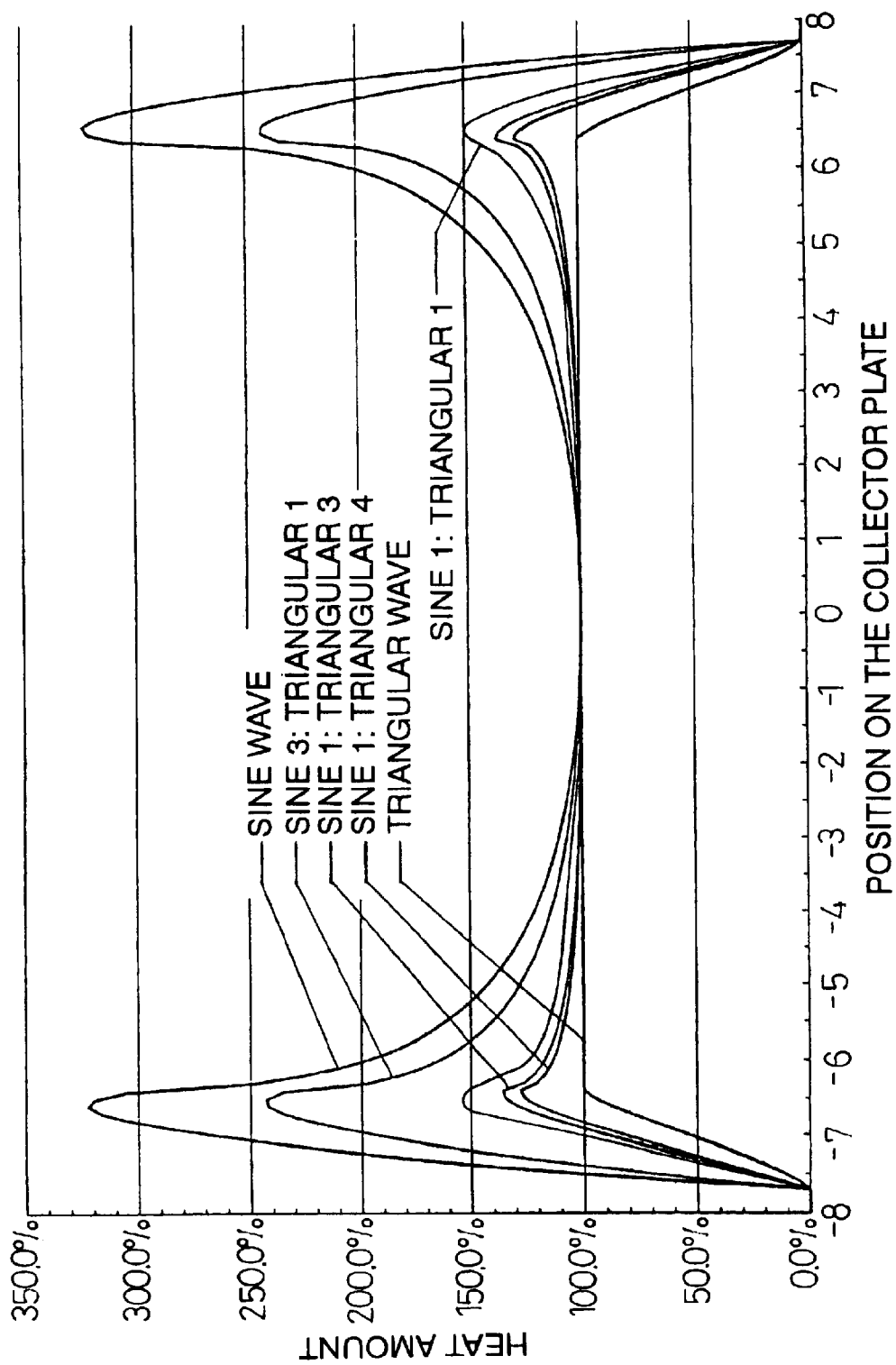
FIG. 9 is a graph showing the relationship between the signal waveforms for scanning and heat applied to a collector plate in the widthwise direction thereof.
Figure 10A:
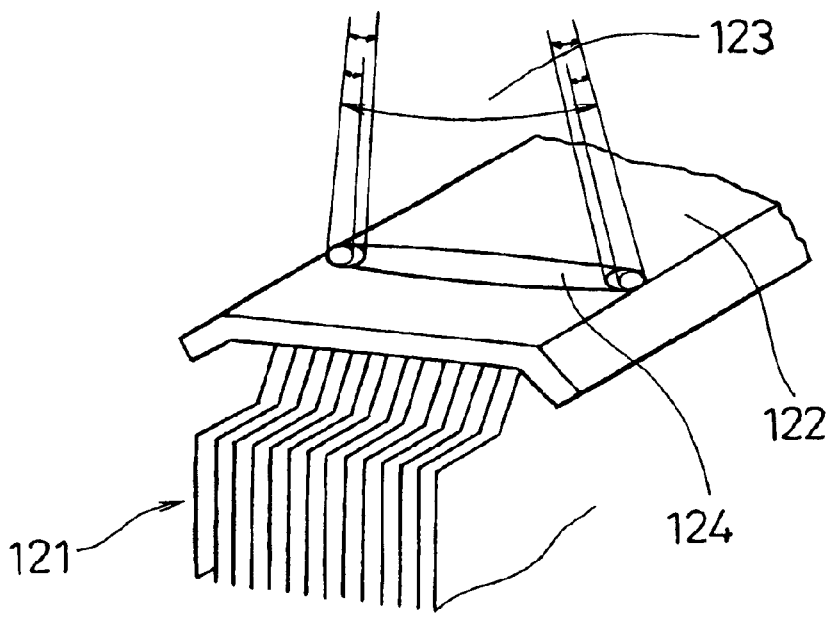
FIG. 10A is a perspective view illustrating a conventional method for welding a collector plate to an electrode plate group.
Figure 10B:
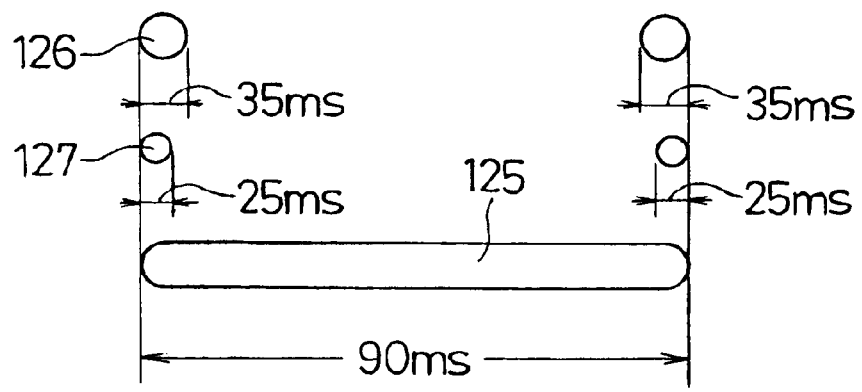
FIG. 10B is a diagram given in explanation of the electronic beam irradiating process in this method.

FIG. 9 is a graph indicating suitable combining ratios of triangular waves and sine waves. The amount of heat applied to the collector plate would be constant, if the signal waveform for scanning were triangular. It is now assumed that the constant heat amount is 100% when scanning is performed with a triangular signal waveform. If a complex waveform having a 4 to 1 triangular waves to sine waves is generated, the output voltage being controlled so that the heat amount will be 100% in the middle portion of the collector plate, then the heat amount at opposite ends of the collector plate becomes about 125%. Similarly, if the triangular waves and sine waves are combined at a ratio of 1 to 1, the heat amount at opposite ends will become about 155%. Thus the amount of heat that should be applied at opposite ends of the collector plate can be properly increased, and welding can be performed favorably at both ends.

On the other hand, if the ratio of sine waves to triangular waves is too high, for example, if a sine wave or a complex signal wave having a 1 to 3 triangular wave to sine wave is used, then the amount of heat at opposite ends of the collector plate will become two or three times higher than that in the middle portion, which would only result in various problems caused by excessive heat. Accordingly, the combining ratios of triangular wave to sine wave should preferably be in the range of 1~4:1.

Thus the entire width of the collector plate can be joined to the electrode plate group uniformly, by using a complex signal waveform for the scanning in which a triangular wave and a sine wave are combined at a suitable ratio. Since no additional scanning is necessary at both ends of the collector plate, the welding of one line can be performed in a short period of time, and productivity is enhanced.

To give a specific example, using a signal waveform for scanning in which a triangular wave and a sine wave are combined at a ratio of 3 to 1, the electronic beam 44 was scanned with a frequency of 4 kHz, whereby one line covering the entire width at a portion of the collector plate 43 could be favorably welded in 90 ms as illustrated in FIG. 6. Thus, as compared to the prior art method with which welding of one line took 210 ms due to additional scannings at both ends of the collector plate, the productivity can be remarkably enhanced in accordance with the present invention.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery manufacturing method comprising the steps of:
   drying a plurality of positive electrode plates and a plurality of negative electrode plates;
   layering the positive electrode plates and negative electrode plates alternately upon one another with intervening separators therebetween, thereby constituting electrode plate groups;
   assembling collector plates to the electrode plate groups;
   transferring the electrode plate groups with the collector plates from one to another of a plurality of vacuum chambers having different vacuum levels;
   providing said plurality of vacuum chambers each with a gate for receiving or releasing at least one electrode plate group of said electrode plate groups;
   performing a welding operation using electronic beams in one of the plurality of vacuum chambers in which a vacuum of sufficient level to effect irradiation of electronic beams is created; and
   said welding operation including welding at least one collector plate of said collector plates to an end face of at least one electrode plate group of said electrode plate groups.

2. The battery manufacturing method according to claim 1, wherein the plurality of vacuum chambers are arranged adjacent each other such that the vacuum level is gradually increased from an upstream side to a downstream side as the electrode plate groups with the collector plates are transferred from one to another of said vacuum chambers, and the welding operation is performed in one vacuum chamber in which the vacuum level is highest.

3. A battery manufacturing method according to claim 2, further comprising the step of transferring the electrode plate groups with the collector plates from one vacuum chamber to an adjacent vacuum chamber including a series of:
   opening a first gate of said gates of said plurality of vacuum chambers on the upstream side of a first vacuum chamber of said plurality of vacuum chambers;
   introducing the electrode plate groups with the collector plates into said first vacuum chamber;
   closing said first gate;
   setting a pressure of said first vacuum chamber to a predetermined level;
   providing and opening a second gate on the downstream side of said first vacuum chamber; and
   introducing the electrode plate groups with the collector plates into an adjacent second vacuum chamber of said plurality of vacuum chambers.

4. A battery manufacturing method according to claim 3, further comprising the step of introducing the electrode plate groups with the collector plates into a post-processing vacuum chamber after welding and before moving said electrode plate groups to an outside.

5. A battery manufacturing method according to claim 4, further comprising the step of introducing a dry gas in the first vacuum chamber and the post-processing vacuum chamber when opening a gate of the first vacuum chamber on the most upstream side and when opening a gate of the post-processing vacuum chamber.

6. A battery manufacturing method according to claim 1, further comprising the step of performing the welding operation including irradiating an electronic beam on the collector plate and scanning along a direction in which the electrode plates are layered, using a signal waveform which causes the scanning speed at either end of the collector plate to be slower than the scanning speed in a middle portion of the collector plate.

7. A battery manufacturing method according to claim 6, wherein the signal waveform is obtained by combining a triangular wave and a sine wave at predetermined ratios of occurrence.

8. A battery manufacturing method according to claim 7, wherein the signal waveform has triangular wave to sine wave ratios of occurrence in the range of 1 to 4:1.

9. The battery manufacturing method according to claim 8, wherein the welding operation is performed in 90 ms.

10. The battery manufacturing method according to claim 1, wherein the welding operation is performed in 90 ms.

* * * * *